United States Patent
Arai et al.

(10) Patent No.: US 12,497,544 B2
(45) Date of Patent: Dec. 16, 2025

(54) FUSION SHEET AND WIRING MEMBER

(71) Applicants: Sumitomo Wiring Systems, Ltd., Mie (JP); TOYOTA JIDOSHA KABUSHIKI KAISHA, Aichi (JP)

(72) Inventors: Kenta Arai, Mie (JP); Takuya Kaba, Mie (JP); Daisuke Ebata, Mie (JP); Hirozumi Okaniwa, Mie (JP); Yusuke Mitani, Mie (JP); Itsuo Wakabayashi, Aichi (JP)

(73) Assignees: SUMITOMO WIRING SYSTEMS, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 181 days.

(21) Appl. No.: 18/275,047

(22) PCT Filed: Feb. 1, 2022

(86) PCT No.: PCT/JP2022/003887
§ 371 (c)(1),
(2) Date: Jul. 31, 2023

(87) PCT Pub. No.: WO2022/172814
PCT Pub. Date: Aug. 18, 2022

(65) Prior Publication Data
US 2024/0100783 A1   Mar. 28, 2024

(30) Foreign Application Priority Data
Feb. 12, 2021   (JP) .................................. 2021-020978

(51) Int. Cl.
*B32B 7/14* (2006.01)
*C09J 7/00* (2018.01)
*H02G 3/30* (2006.01)

(52) U.S. Cl.
CPC ...................... *C09J 7/00* (2013.01); *B32B 7/14* (2013.01); *H02G 3/305* (2013.01);
(Continued)

(58) Field of Classification Search
CPC ........ B32B 7/14; C09J 7/00; C09J 7/30; C09J 2203/302; C09J 2203/366;
(Continued)

(56) References Cited

U.S. PATENT DOCUMENTS 6,444,309 B1   9/2002   Hashimoto et al.
2016/0143791 A1 *   5/2016   Wood .................... A61F 13/581
24/304

(Continued)

FOREIGN PATENT DOCUMENTS

CN   105338939   2/2016
DE   3906120 A1 *   8/1990
(Continued)

OTHER PUBLICATIONS

International Preliminary Report on Patentability issued in PCT/JP2022/003887, dated Aug. 17, 2023.
(Continued)

*Primary Examiner* — Gerard Higgins
(74) *Attorney, Agent, or Firm* — GREENBLUM & BERNSTEIN, P.L.C.

(57) ABSTRACT

A fusion sheet includes: a base material layer including a first surface and a second surface; a fusion base part partially stacked to the first surface of the base material layer and fusible to a wire-like transmission member; and an adhesive base part partially stacked to the second surface of the base material layer and having larger adhesive strength with an adhesive member than the base material layer. A first section and a second section are provided along an extension direction of the base material layer. The first section is a
(Continued)

section where the adhesive base part is stacked to the base material layer other than a laminated section where the adhesive base part is stacked. The second section is a section where the adhesive base part is stacked to the base material layer other than a laminated section where the fusion base part is stacked.

10 Claims, 11 Drawing Sheets

(52) U.S. Cl.
CPC .. *C09J 2203/302* (2013.01); *C09J 2301/1242* (2020.08); *C09J 2301/21* (2020.08)

(58) Field of Classification Search
CPC .......... C09J 2301/1242; C09J 2301/21; H02B 3/0456; H02B 3/305
See application file for complete search history.

(56) References Cited

U.S. PATENT DOCUMENTS

2020/0070749 A1   3/2020   Mizuno et al.
2022/0199287 A1   6/2022   Mizuno et al.

FOREIGN PATENT DOCUMENTS

| JP | 11-335637 | 12/1999 |
| JP | 2002-112440 | 4/2002 |
| JP | 2020-24787 | 2/2020 |
| WO | 2017/002634 | 1/2017 |
| WO | 2018/207641 | 11/2018 |
| WO | 2020/031650 | 2/2020 |
| WO | 2020/203252 | 10/2020 |

OTHER PUBLICATIONS

International Search Report issued in International Patent Application No. PCT/JP2022/003887, dated Apr. 26, 2022.
Japan Official Action issued in JP Application No. 2021-020978, dated Dec. 5, 2023.
China Office Action and Search Report received in CN Application No. 202280012097.0, dated Jul. 18, 2025, and English language translation thereof.

* cited by examiner

FUSION SHEET AND WIRING MEMBER

TECHNICAL FIELD

The present disclosure relates to a fusion sheet and a wiring member.

BACKGROUND ART

Patent Document 1 discloses a wiring member in which a wire-like transmission member and a sheet member are fixed to each other. For example, Patent Document 1 discloses that the sheet member is made up of a resin layer, whose inner portion is evenly filled, and a non-woven cloth layer stacked to each other, and the resin layer is used for fusion to the wire-like transmission member.

PRIOR ART DOCUMENTS

Patent Document(s)
Patent Document 1: Japanese Patent Application Laid-Open No. 2020-24787

SUMMARY

Problem to be Solved by the Invention

The non-woven cloth layer is fuzzy, and may have low adhesiveness with a double-sided adhesive tape, thus improvement of adhesiveness of the sheet member is desired. In the meanwhile, when improvement of adhesiveness of the sheet member is performed, it is also desired to avoid increase in weight of the sheet member and decrease in fusibility of the sheet member fused to the wire-like transmission member.

Accordingly, an object is to provide a technique capable of obtaining favorable adhesiveness and fusibility while avoiding increase in weight in a fusion sheet.

Means to Solve the Problem

A fusion sheet according to the present disclosure is a fusion sheet including: a base material layer including a first surface and a second surface; a fusion base part partially stacked to the first surface of the base material layer and fusible to a wire-like transmission member; and an adhesive base part partially stacked to the second surface of the base material layer and having larger adhesive strength with an adhesive member than the base material layer, wherein a first section and a second section are provided along an extension direction of the base material layer, the first section is a section Where the fusion base part is stacked to the base material layer other than a laminated section where the adhesive base part is stacked, and the second section is a section where the adhesive base part is stacked to the base material layer other than a laminated section where the fusion base part is stacked.

Effects of the Invention

According to the present disclosure, favorable adhesiveness and fusibility can be obtained while avoiding increase in weight in a fusion sheet.

DESCRIPTION OF EMBODIMENT(S)

Description of Embodiment of Present Disclosure

Figure 1:
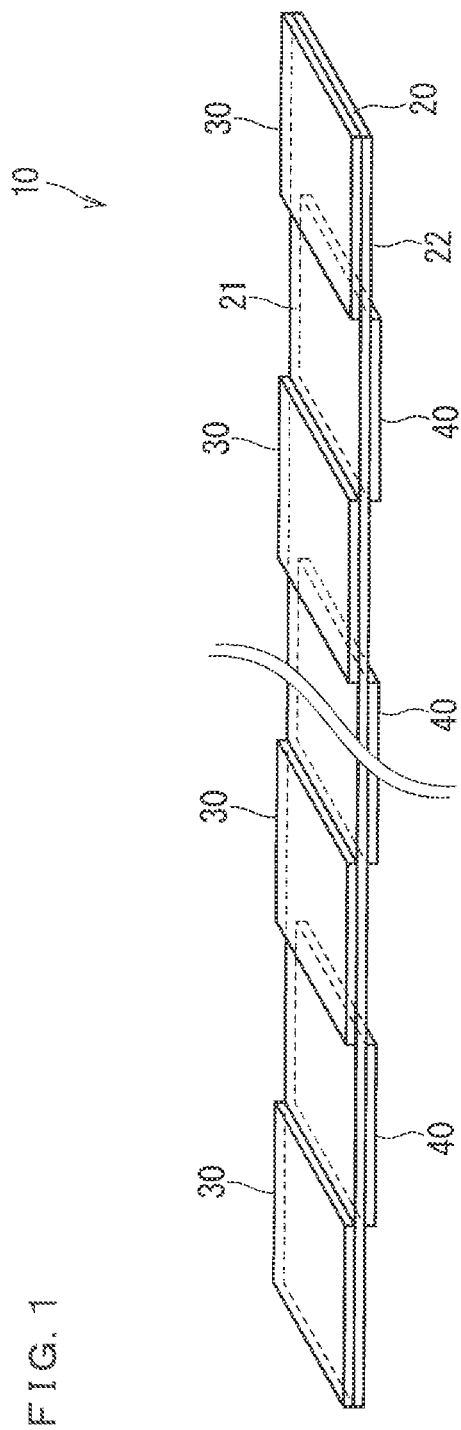
FIG. 1 is a perspective view illustrating a fusion sheet according to an embodiment 1.

Embodiments of the present disclosure are listed and described firstly.

A fusion sheet according to the present disclosure is as follows.

(1) A fusion sheet includes: a base material layer including a first surface and a second surface; a fusion base part partially stacked to the first surface of the base material layer and fusible to a wire-like transmission member; and an adhesive base part partially stacked to the second surface of the base material layer and having larger adhesive strength with an adhesive member than the base material layer, wherein a first section and a second section are provided along an extension direction of the base material layer, the first section is a section where the fusion base part is stacked to the base material layer other than a laminated section where the adhesive base part is stacked, and the second section is a section where the adhesive base part is stacked to the base material layer other than a laminated section where the fusion base part is stacked. The adhesive base part is provided, thus favorable adhesiveness can be obtained. The first section and the second section are provided, thus a region where the fusion base part is provided and a region where the adhesive base part is provided can be reduced, thus increase in weight of the fusion sheet can be suppressed. The first section does not include the adhesive base part, thus favorable fusibility between the fusion base part and the wire-like transmission member is obtained in the first section.

(2) It is also applicable that in the fusion sheet according to (1), the second surface of the base material layer is exposed in the first section, and the first surface of the base material layer is exposed in the second section. Accordingly, the base material layer can be exposed. In the first section, a thickness of the fusion sheet can be reduced, and favorable fusibility can be obtained.

(3) In the fusion sheet according to (1) or (2), the laminated section of the fusion base part and the laminated section of the adhesive base part on the base material layer may be separately provided so as not to be overlapped with each other. Accordingly, increase in weight of the fusion sheet is suppressed. Even when a dimension of the fusion base part along the extension direction of the base material layer is small, a jig for fusion hardly has contact with the adhesive base part.

(4) In the fusion sheet according to any one of (1) to (3), a dimension of the second section may be larger than a dimension of the first section along the extension direction of the base material layer. Accordingly, a region for adhesion along the extension direction of the base material layer can be increased.

(5) It is also applicable that in the fusion sheet according to any one of (1) to (4), the base material layer includes two straight regions each extending in a direction different from each other and a connection region connecting the two straight regions, the first section is provided in an end portion on a side of the connection region in each of the two straight regions, and the second section is provided to the connection region. When the wire-like transmission member is curved and disposed from one of the two straight regions to the other one of the two straight regions via the connection region, the wire-like transmission member is fused to the fusion base part in the first section, thus is easily held in a curved route.

(6) In the fusion sheet according to any one of (1) to (5), a resin material as a main material of the fusion base part may be a same as a resin material as a main material of the adhesive base part. Accordingly, the wire-like transmission member can also be easily fused to the adhesive base part.

(7) In the fusion sheet according to any one of (1) to (6), the base material layer is formed of a fibrous material sheet, the adhesive base part is formed of a sheet having an inner portion evenly filled, and a surface of the adhesive base part is smoother than a surface of the base material layer. Accordingly, the adhesive base part can be simply provided.

(8) A wiring member according to the present disclosure is a wiring member including the fusion sheet according to any one of (1) to (7) and a wire-like transmission member fused to the fusion base part in the first section. The adhesive base part is provided, thus favorable adhesiveness can be obtained. The first section and the second section are provided, thus a region where the fusion base part is provided and a region where the adhesive base part is provided can be reduced, thus increase in weight of the fusion sheet can be suppressed. The first section does not include the adhesive base part, thus favorable fusibility between the fusion base part and the wire-like transmission member is obtained in the first section.

Detailed Description of Embodiment of Present Disclosure

Specific examples of a fusion sheet according to the present disclosure are described hereinafter with reference to the drawings. The present disclosure is not limited to these exemplification, but is indicated by claims, and it is intended that meanings equivalent to claims and all modifications within a scope of claims are included.

Embodiment 1

A fusion sheet according to an embodiment 1 is described hereinafter. FIG. 1 is a perspective view illustrating a fusion sheet 10 according to the embodiment 1.

The fusion sheet 10 includes a base material layer 20, a fusion base part 30, and an adhesive base part 40. The base material layer 20 includes a first surface 21 and a second surface 22. Each of the first surface 21 and the second surface 22 faces a side opposite to each other. The base material layer 20 is continuously provided from a first end portion to a second end portion along an extension direction of the fusion sheet 10. An extension direction of the base material layer 20 is the extension direction of the fusion sheet 10. The fusion base part 30 is partially stacked to the first surface 21 of the base material layer 20. The fusion base part 30 is stacked in a plurality of positions at intervals along the extension direction of the base material layer 20. The adhesive base part 40 is partially stacked to the second surface 22 of the base material layer 20. The adhesive base part 40 is stacked in a plurality of positions at intervals along the extension direction of the base material layer 20. In two surfaces of the fusion sheet 10, the surface where the fusion base part 30 is provided is a first surface of the fusion sheet 10, and the surface where the adhesive base part 40 is provided is a second surface of the fusion sheet 10.

The base material layer 20 holds the fusion base part 30 and the adhesive base part 40. The base material layer 20 may have a structure or may also be formed of a material different from the fusion base part 30 and the adhesive base part 40. The base material layer 20 may enhance a function of the fusion base part 30 or the adhesive base part 40, or may add a function which the fusion base part 30 and the adhesive base part 40 do not have to the fusion sheet 10.

Herein, the base material ayer 20 has a single ayer structure. For example, the base material layer 20 is formed of a fibrous material sheet. The fibrous material sheet is a collected body of fibers. The fibrous material sheet is a regular collection of a string having fibers (for example, a woven fabric or a braided fabric) or a random collection of fibers (for example, a nonwoven cloth). Fibers constituting the fibrous material sheet may be fuzzy in a surface of the fibrous material sheet Adhesiveness of the surface of the fibrous material sheet with an adhesive member 90 (refer to FIG. 4) is reduced by this fuzz. For example, when a substantial contact area between the surface of the fibrous material sheet and the adhesive member is reduced or fibers fray from the fibrous material sheet, the adhesiveness decreases. When the fibrous material sheet is a non-woven cloth or a woven fabric or a braided fabric made up of strings of multi-filament for example, the fibers constituting the fibrous material sheet easily fuzz.

A main material constituting the base material layer 20 is not particularly limited, but can be appropriately set. For example, when the base material layer 20 is the fibrous material sheet, the fibers constituting the fibrous material sheet may be natural fibers or chemical fibers such as synthetic fibers. Any fiber is applicable as the synthetic fiber, thus applicable is a polyester series synthetic fiber such as polyethylene terephthalate (PET), a polyolefin series synthetic fiber such as polyethylene (PE) or polypropylene (PP), or a polyamide series synthetic fiber such as nylon, for example.

Figure 2:
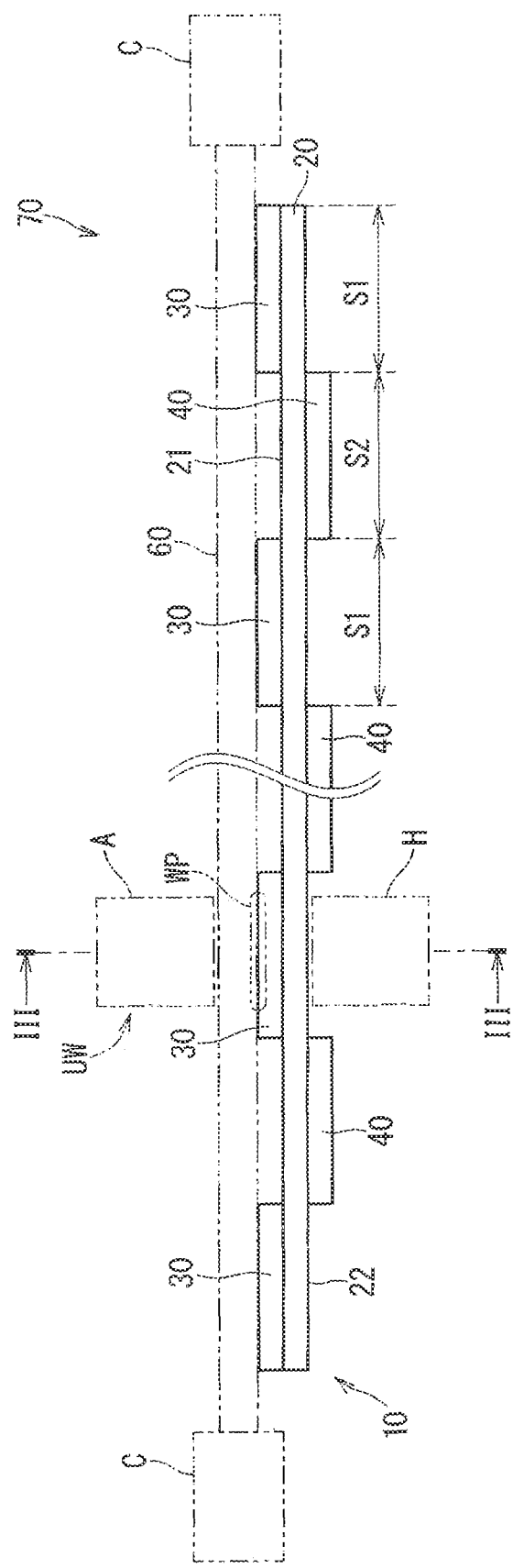
FIG. 2 is an explanation diagram illustrating a wire-like transmission member fused to the fusion sheet.

The fusion base part 30 is a part fusible to a wire-like transmission member 60 (refer to FIG. 2). The fusion base part 30 is fused to a covering layer 62 (refer to FIG. 3) of the wire-like transmission member 60 more easily than the base material layer 20. A main material of the fusion base part 30 may be the same as or different from that of the base material layer 20. The main material of the fusion base part 30 may be a resin material, or may preferably be a thermoplastic resin material. The resin material of the fusion base part 30 is preferably softened and fused to the wire-like transmission me Tiber 60. A type of the resin material is not particularly limited, however, polyvinyl chloride (PVC), PE, PP, and PET, for example, can be adopted. For example, the fusion base part 30 is made up of a resin material compatible with the resin material of the covering layer 62.

A structure of the fusion base part 30 is not particularly limited, but can be appropriately set. For example, the fusion base part 30 may be a sheet having an inner portion evenly filled (also referred to as a non-foam sheet or a solid sheet, for example). For example, the fusion base part 30 is also considered a foam sheet.

The adhesive, base part 40 is a part having larger adhesive strength with the adhesive member 90 than the base material layer 20. For example, a surface of the adhesive base part 40 is smoother than a surface of the base material layer 20, thus fuzz is reduced, the adhesive strength between the adhesive base part 40 and the adhesive member 90 is larger than that between the base material layer 20 and the adhesive member 90. A structure of the adhesive base part 40 may be the same or different from that of the fusion base part 30. For example, the adhesive base part 40 may be formed of a solid sheet of a foam sheet. A main material of the adhesive base part 40 may be the same as or different from that of the base material layer 20. A main material of the adhesive base part 40 may be the same as or different from that of the fusion base part 30. The main material of the adhesive base part 40 may be a resin material, or may preferably be a thermoplastic resin material. A type of the resin material is not particularly limited, however, PVC, PE, PP, and PET, for example, can be adopted.

The fusion base part 30 is fixed to the first surface 21 of the base material layer 20, and the adhesive base part 40 is fixed to the second surface 22 of the base material layer 20. A fixing state of the base material layer 20 and the fusion base part 30 and a fixing state of the base material layer 20 and the adhesive base part 40 are not particularly limited, however, fixing by fusion or bonding is preferable. For example, when the first surface 21 or the second surface 22 of the base material layer 20 is a sheet having a gap in the surface thereof, such as a fibrous material sheet, a resin material or an adhesive agent of the fusion base part 30 or the adhesive base part 40 enters the gap, and can be fixed to the base material layer 20. Such a configuration causes so-called anchor effect, thus the base material layer 20 is firmly fixed to the fusion base part 30 and the adhesive base part 40.

Herein, the fusion base part 30 and the adhesive base part 40 are solid sheet made up of resin, and the base material layer 20 is a fibrous material sheet. Herein, the fusion base part 30 and the adhesive base part 40 are fused to the base material layer 20. The resin of the fusion base part 30 and the adhesive base part 40 enters between the fibers of the base material layer 20 while having flowability, and is then hardened. Accordingly, maintained is a state where the resin of the fusion base part 30 and the adhesive base part 40 enters between the fibers of the base material layer 20, thus each of the fusion base part 30 and the adhesive base part 40 is firmly fixed to the base material layer 20.

The fusion base part 30 and the adhesive base part 40 are formed to be smaller than the base material layer 20. The fusion base part 30 and the base material layer 20 are wholly fixed at a region where they have contact with each other. The fusion base part 30 and the base material layer 20 may also be fixed only at a part of a region where they have contact with each other. The adhesive base part 40 and the base material layer 20 are wholly fixed at a region where they have contact with each other. The adhesive base part 40 and the base material layer 20 may also be fixed only at a part of a region where they have contact with each other.

A planar shape of the fusion base part 30 and adhesive base part 40 is a quadrangular shape. A planar shape of the fusion base part 30 and adhesive base part 40 may be a shape other than a quadrangular shape. The fusion base part 30 and the adhesive base part 40 are formed to have the same size. One of the fusion base part 30 and the adhesive base part 40 may be formed to have a larger size than the other one thereof.

The fusion sheet 10 is provided with a section where a laminated state of each of the fusion base part 30 and the adhesive base part 40 stacked to the base material layer 20 is different from each other along the extension direction. Four sections corresponding to a combination of presence or absence of the fusion base part 30 stacked to the base material layer 20 and presence or absence of the adhesive base part 40 stacked to the base material layer 20 may occur as the section where the laminated state of each of the fusion base part 30 and the adhesive base part 40 stacked to the base material layer 20 is different from each other. In the present disclosure, these four sections are referred to as a first section S1 (refer to FIG. 2), a second section S2 (refer to FIG. 2), a third section S3 (refer to FIG. 6), and a fourth section S4 (refer to FIG. 9).

The first section S1 is a section where the fusion base part 30 is stacked to the base material layer 20 but the adhesive base part 40 is not stacked to the base material layer 20. The first section. S1 is a section where the fusion base part 30 is stacked to the base material layer 20 other than a laminated section where the adhesive base part 40 is stacked. The second section S2 is a section where the adhesive base part 40 is stacked to the base material layer 20 but the fusion base part 30 is not stacked to the base material layer 20. The second section S2 is a section where the adhesive base part 40 is stacked to the base material layer 20 other than a laminated section where the fusion base part 30 is stacked. The third section S3 is a section where the fusion base part 30 and the adhesive base part 40 are not stacked to the base material layer 20. The fourth section S4 is a section where both the fusion base part 30 and the adhesive base part 40 are stacked to the base material layer 20.

The fusion base part 30 appears in the first surface of the fusion sheet 10. A part where the fusion base part 30 may appear in the first surface of the fusion sheet 10 is the first section S1 or the fourth section S4. A part where the fusion base part 30 cannot appear in the first surface of the fusion sheet 10 is the second section S2 or the third section S3. A concave-convex portion occurs in the first surface of the fusion sheet 10 in a thickness direction. The fusion base part 30 appears in a convex portion in the first surface of the fusion sheet 10. The fusion base part 30 does not appear in a concave portion in the first surface of the fusion sheet 10.

The adhesive base part 40 appears in the second surface of the fusion sheet 10. A part where the adhesive base part 40 may appear in the second surface of the fusion sheet 10 is the second section S2 or the fourth section S4. A part where the adhesive base part 40 cannot appear in the second surface of the fusion sheet 10 is the first section S1 or the third section S3. A concave-convex portion occurs in the second surface of the fusion sheet 10 in the thickness direction. The adhesive base part 40 appears in a convex portion in the second surface of the fusion sheet 10. The adhesive base part 40 does not appear in a concave portion in the second surface of the fusion sheet 10.

The fusion sheet 10 is provided with at least the first section S1 and the second section S2 in the four section described above along the extension direction. The third section S3 and the fourth section S4 may be or may not be provided along the extension direction of the fusion sheet 10.

Herein, the laminated section of the fusion base part 30 and the laminated section of the adhesive base part 40 on the base material layer 20 are separately provided so as not to be overlapped with each other. That is to say, the fourth section S4 is not provided to the fusion sheet 10. Furthermore, herein, the first section S1 and the second section S2 are alternately and continuously formed with no interval from the first end portion to the second end portion along the extension direction of the base material layer 20. That is to say, only the first section and the second section are provided to the fusion sheet 10 along the extension direction of the base material layer 20, and the third section S3 and the fourth section S4 are not provided thereto. Thus, the concave-convex shape of the first surface and the concave-convex shape of the second surface are completely reversed in the fusion sheet 10. The fusion base part 30 is provided to both the first end portion and the second end portion of the fusion sheet 10 along the extension direction of the base material layer 20. The adhesive base part 40 may be provided to both the first end portion and the second end portion of the fusion sheet 10 along the extension direction of the base material layer 20. It is also applicable that fusion base part is provided to the first end portion and the adhesive base part 40 is provided to the second end portion of the fusion sheet 10 along the extension direction of the base material layer 20.

Herein, the other layer is not stacked to a portion of the first surface 21 of the base material layer 20 where the fusion base part 30 is not provided. Thus, the first surface 21 of the base material layer 20 is exposed in the second section S2 of the fusion sheet 10. The base material layer 20 appears in a portion different from the fusion base part 30 (herein, the concave portion in the first surface of the fusion sheet 10) of the first surface of the fusion sheet 10. Herein, the other layer is not stacked to a portion of the second surface 22 of the base material layer 20 where the adhesive base part 40 is not provided. Thus, the second surface 22 of the base material layer 20 is exposed in the first section S1 of the fusion sheet 10. The base material layer 20 appears in a portion different from the adhesive base part 40 (herein, the concave portion in the second surface of the fusion sheet 10) of the second surface of the fusion sheet 10.

In the example illustrated in FIG. 1, the fusion base part 30 and the adhesive base part 40 are wholly provided from one end to the other end along a width direction of the base material layer 20. The fusion base part 30 may be provided to only a part of the base material layer 20 along the width direction. The adhesive base part 40 may be provided to only a part of the base material layer 20 along the width direction. For example, it is also applicable that the fusion base part 30 and the adhesive base part 40 are not provided to both end portions of the base material layer 20 along the extension direction hut are provided to only an intermediate portion thereof. In this case, the third section S3 is continuously formed from one end portion to the other end portion along the width direction of the base material layer 20 in each of both end portions of the base material layer 20 along the extension direction.

The fusion sheet 10 may be a flexible member. For example, the fusion base part 30 and the adhesive base part 40 are solid sheets made up of flexible resin such as flexible PVC as a material, the base material layer 20 is a non-woven cloth made up of PET as a material, and the fusion sheet 10 is a flexible member. For example, the fusion sheet 10 may have flexibility so as to be able to follow bending of the wire-like transmission member 60. That is to say, it is also applicable that the wiring member 70 can be bended in a thickness direction (bending so that a fold line follows the main surface of the fusion sheet 10).

<Wiring Member 70>

Figure 3:
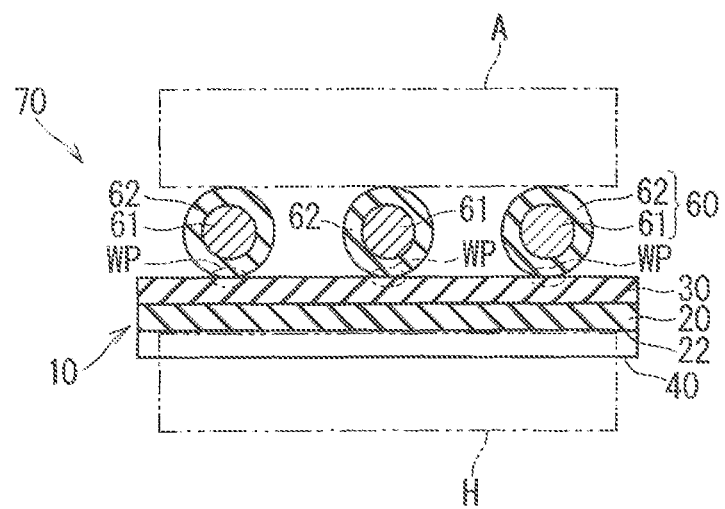
FIG. 3 is a cross-sectional view along a III-III line in FIG. 2.

FIG. 2 is an explanation diagram illustrating the wiring member 70 made b fusing the wire-like transmission member 60 to the fusion sheet 10. FIG. 3 is a cross-sectional view along a III-III line in FIG. 2.

The wiring member 70 includes the fusion sheet 10 and the wire-like transmission member 60. The wire-like transmission member 60 is disposed on the first surface of the fusion sheet 10 to extend along the extension direction of the base material. The wire-like transmission member 60 is fused to the fusion base part 30 in the first section S1.

The wire like transmission member 60 is a wire-like member transmitting electrical power or light, for example. The wire-like transmission member 60 includes one or a plurality of wire-like transmission members. Herein, the plurality of wire-like transmission members 60 are included. The fusion sheet 10 is formed into a flat shape as a whole. The plurality of wire-like transmission members 60 are fixed to the fusion sheet 10 while being arranged in the width direction of the fusion sheet 10, thus the wiring member 70 is kept in a flat state.

The wire-like transmission member 60 is assumed to be a member connecting components in a vehicle. A connector C, for example, is provided on an end portion of the wire-like transmission member 60. This connector C is connected to a connector provided to the other side component, thus the wire-like transmission member 60 is connected to the other side component. That is to say, the present wiring member 70 is used as the wiring member 70 electrically connecting various types of component in a vehicle, for example (or connecting them so that they can perform optical communication). The connector C may be fixed to the fusion sheet 10.

A route of the wire-like transmission members 60 is set in accordance with a position of a component to which the wire-like transmission member 60 is connected, for example. The wire-like transmission member 60 is fixed to the fusion sheet 10, thus the wire-like transmission member 60 is kept in a form following a wiring route corresponding to a position of a component as a connection destination of each wire-like transmission member 60. The wire-like transmission member 60 may be fixed to the fusion sheet 10 in a state where a branch wire is branched from a main wire. The fusion sheet 10 may also be formed into a shape in which a portion to which the branch wire is fixed is branched from a portion to which the main wire is fixed. The wire-like transmission member 60 may have a route curved on the fusion sheet 10. A planar shape of the fusion sheet 10 may also be a shape curved in accordance with the curved route of the wire-like transmission member 60.

The wire-like transmission member 60 includes a transmission wire body 61 and a covering layer 62. The transmission wire body 61 transmits an electrical power or light, for example. The transmission wire body 61 corresponds to a core wire in an electrical wire, or corresponds to a core and a clad in an optical fiber. The covering layer 62 covers the transmission wire body 61. For example, the covering layer 62 is formed of resin extrusion molded around the transmission wire body 61. For example, the wire-like transmission member 60 may be a general wire having a core wire and a covering layer 62 around the core wire, or may also be a shield wire, a twisted wire, an enamel wire, a nichrome wire, or an optical fiber.

The wire-like transmission member 60 transmitting the electrical power may be various kinds of signal lines or various kinds of power lines. Some of the wire-like transmission members 60 transmitting the electrical power may be used as an antenna or coil, for example, transmitting or receiving a signal or electrical power to or from a space.

The wire-like transmission member 60 may be a single wire-like object or a composite object of a plurality of wire-like objects (a twisted wire and a cable made up of a plurality of wire-like objects covered by a sheath).

The wire-like transmission member 60 and the fusion sheet 10 are fixed by fusing the covering layer 62 and the fusion base part 30. A portion where the wire-like transmission member 60 and the fusion sheet 10 are fused to each other is referred to as a fusion part WP. It is sufficient that both a material of the covering layer 62 and a material of the fusion base part 30 are melted and combined in the fusion part WP. In this case, a resin material as a main material of the covering layer 62 is preferably the same as a resin material as a main material of the fusion base part 30. Only one of the resin material of the covering layer 62 and the resin material of the fusion base part 30 may be melted and bonded to the other side member.

The wire-like transmission member 60 and the fusion sheet 10 may be fused by a fusion machine having a heating pressurizing mechanism. Such a fusion machine is not particularly limited, but is an ultrasonic fusion machine UW, for example. The ultrasonic fusion machine UW includes a horn H and an anvil A as the heating pressurizing mechanism. The horn H is a member located on a side of one of two members fused to each other to provide a portion to be fused with ultrasonic vibration. The anvil A is located on an opposite side of two members fused to each other from the horn H. Two members fused to each other receives the ultrasonic vibration from the horn H while being sandwiched between the horn H and the anvil A. This ultrasonic vibration causes friction heat in the portion to be fused, thereby heating the portion to be fused. At this time, a distance from a heating member (herein, the horn H) to the portion to be fused is preferably small from a viewpoint of efficiently heating the portion to be fused (herein, efficiently generating the friction heat in the portion to be fused by the ultrasonic vibration) In the present example, the heating member (herein, the horn H) is located on a side of the fusion sheet 10. In the present example, the adhesive base part 40 is not provided in the first section S1, thus the horn H can be brought close to the fusion base part 30. Accordingly, favorable fusibility between the wire-like transmission member 60 and the fusion sheet 10 can be obtained.

In the example illustrated in FIG. 2, only a part of the fusion base part 30 along the extension direction of the base material layer 20 serves as the fusion part WP. A portion serving as the fusion part WP along the extension direction of the base material layer 20 and a portion which does not serve as the fusion part WP occur in the fusion base part 30. The reason is that the horn H is smaller than the fusion base part 30. When the first section S1 and the second section S2 are continuously formed with no interval along the extension direction of the base material layer 20 as with the present example, a possibility of interference with the horn H from the adhesive base part 40 can be reduced by making the horn H be smaller than the fusion base part 30. The fusion base part 30 along the extension direction of the base material layer 20 may wholly serve as the fusion part WP.

<Fixing Structure of Wiring Member 70>

Figure 4:
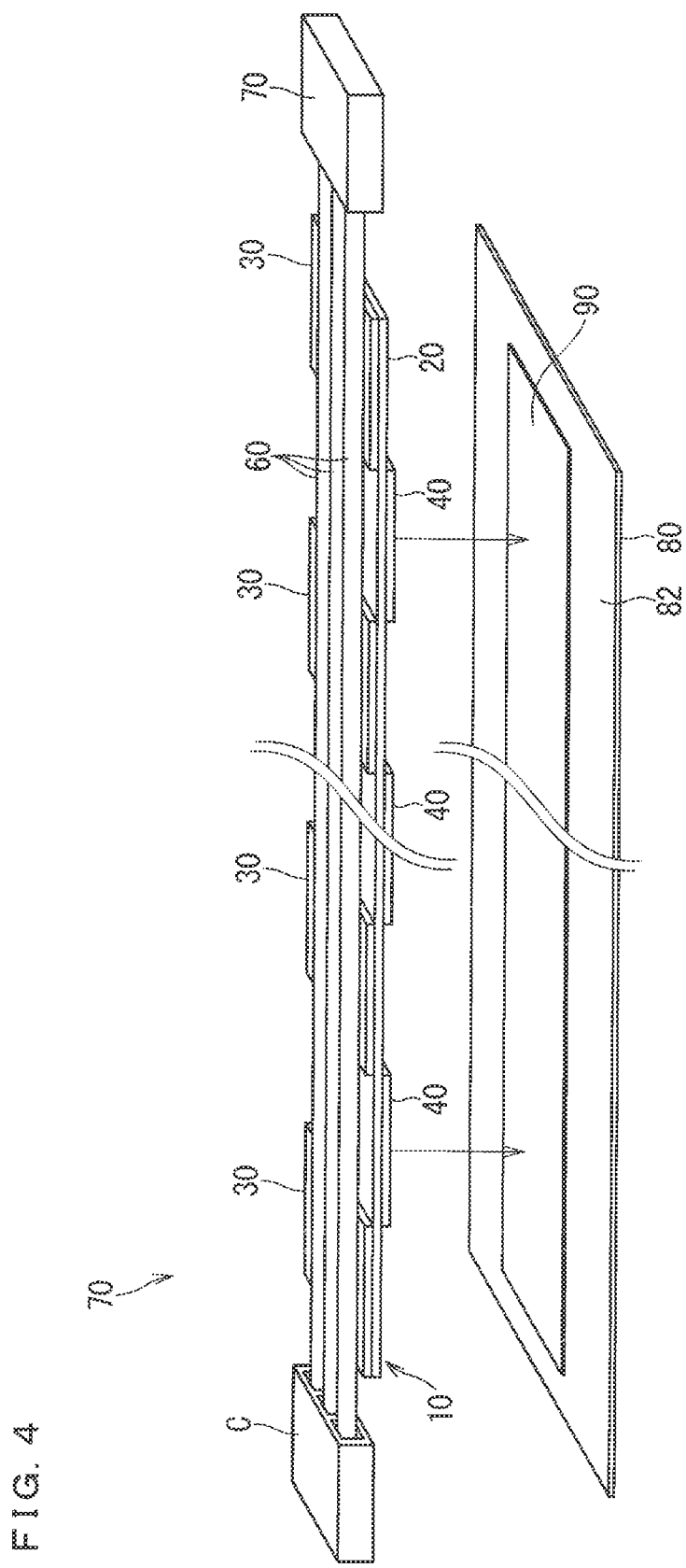
FIG. 4 is an exploded perspective view illustrating fixation of the wiring member.
Figure 5:
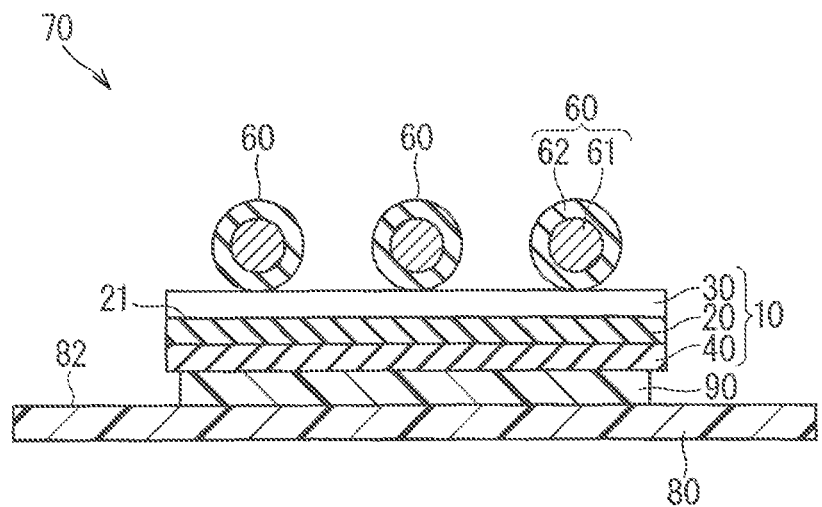
FIG. 5 is a cross-sectional view illustrating a fixing structure of the wiring member.

FIG. 4 is an exploded perspective view illustrating fixation of the wiring member 70. FIG. 5 is a cross-sectional view illustrating a fixing structure of the wiring member 70.

Any component mounted to a vehicle is applicable to a fixing target 80 of the wiring member 70, thus an interior member such as a roof trim, an exterior member such as a vehicle body panel, or a body, for example, may also be applied. The fixing target 80 includes an arrangement surface 82. The wiring member 70 is disposed on the arrangement surface 82. It is also applicable that the arrangement surface 82 is a flat surface, and the wiring member 70 is arranged while being kept in a flat form along the flat surface. It is also applicable that the arrangement surface 82 is a curved surface, and the wiring member 70 is curved and arranged along the curved surface. It is also applicable that the arrangement surface 82 includes a level difference, and the wiring member 70 is disposed to pass across the level difference.

The adhesive member 90 is provided on the arrangement surface 82. The adhesive member 90 is not particularly limited, but is a double-sided adhesive tape such as a butyl tape, for example. The adhesive member 90 is continuously provided along the extension direction of the fusion sheet 10. The adhesive member 90 may also be intermittently provided along the extension direction of the fusion sheet 10. In this case, it is sufficient that the adhesive member 90 is partially provided to a position where the second section S2 is disposed.

The wiring member 70 is disposed on the arrangement surface 82 in a posture in which the second surface of the fusion sheet 10 where the adhesive base part 40 appears is directed to the adhesive member 90. The adhesive base part 40 adheres to the adhesive member 90, thus the wiring member 70 is fixed to the fixing target 80. The adhesive base part 40 has larger adhesive strength with the adhesive member 90 than the base material layer 20, thus favorable adhesiveness is obtained. A portion of the second surface of the fusion sheet 10 where the adhesive base part 40 is not provided (for example, the first section S1) may or may not have contact with the adhesive member 90.

<Effect>

According to the fusion sheet 10 having the above configuration and the wiring member 70 including the fusion sheet 10, the adhesive base part 40 is provided, thus favorable adhesiveness can be obtained. The first section S1 and the second section S2 are provided, thus the region where the fusion base part 30 is provided and the region where the adhesive base part 40 is provided can be reduced, thus increase in weight of the fusion sheet 10 can be suppressed. The first section S1 does not include the adhesive base part 40, thus favorable fusibility between the fusion base part 30 and the wire-like transmission member 60 is obtained in the first section S1.

The laminated section of the fusion base part 30 and the laminated section of the adhesive base part 40 on the base material layer 20 are separately provided so as not to be overlapped with each other. Accordingly, increase in weight of the fusion sheet 10 is suppressed. Even when a dimension of the fusion base part 30 along the extension direction of the base material layer 20 is small, a jig for fusion hardly has contact with the adhesive base part 40.

The second surface 22 of the base material layer 20 is exposed in the first section S1, and the first surface 21 of the base material layer 20 is exposed in the second section S2. Accordingly, the base material layer 20 can be exposed. In the first section S1, a thickness of the fusion sheet 10 can be reduced, and favorable fusibility can be obtained.

The resin material as the main material of the fusion base part 30 is the same as the resin material as the main material of the adhesive base part 40. Accordingly, the wire-like transmission member 60 can also be easily fused to the adhesive base part 40. The base material layer 20 is formed of the fibrous material sheet, the adhesive base part 40 is formed of the sheet having the inner portion evenly filled, and the surface of the adhesive base part 40 is smoother than the surface of the base material layer 20. Accordingly, the adhesive base part 40 can be simply provided.

Embodiment 2

Figure 6:
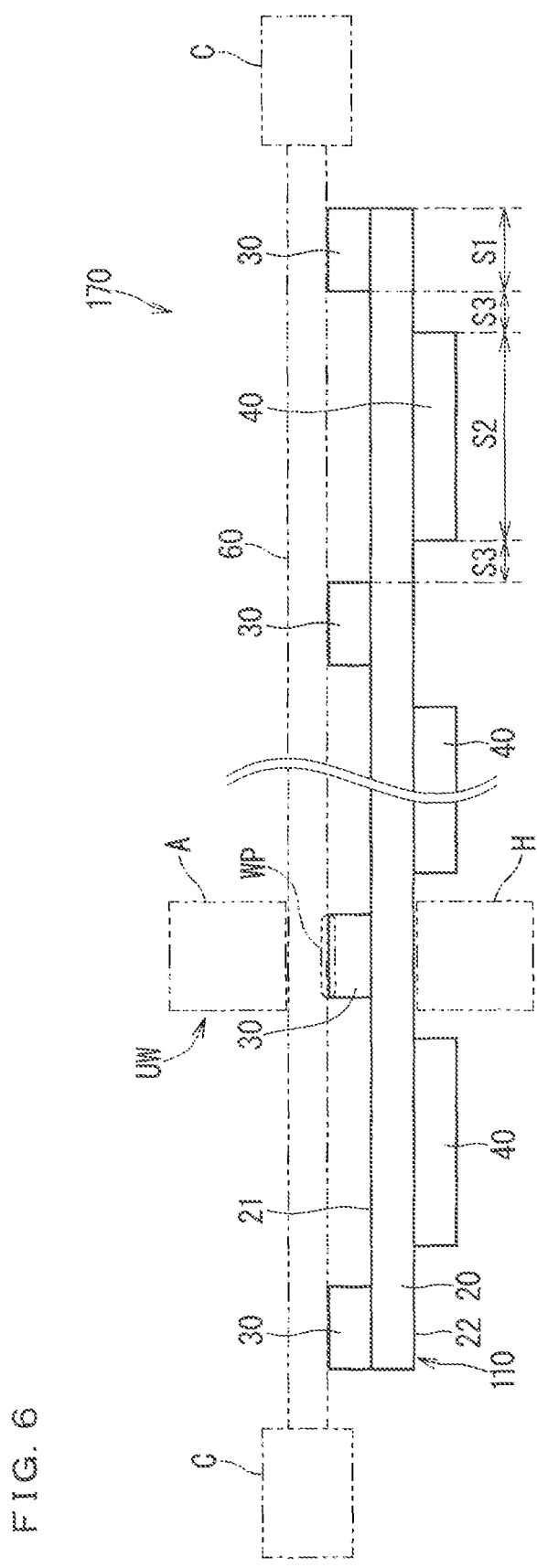
FIG. 6 is a side view illustrating a fusion sheet according to an embodiment 2 and a wiring member including the fusion sheet.
Figure 7:
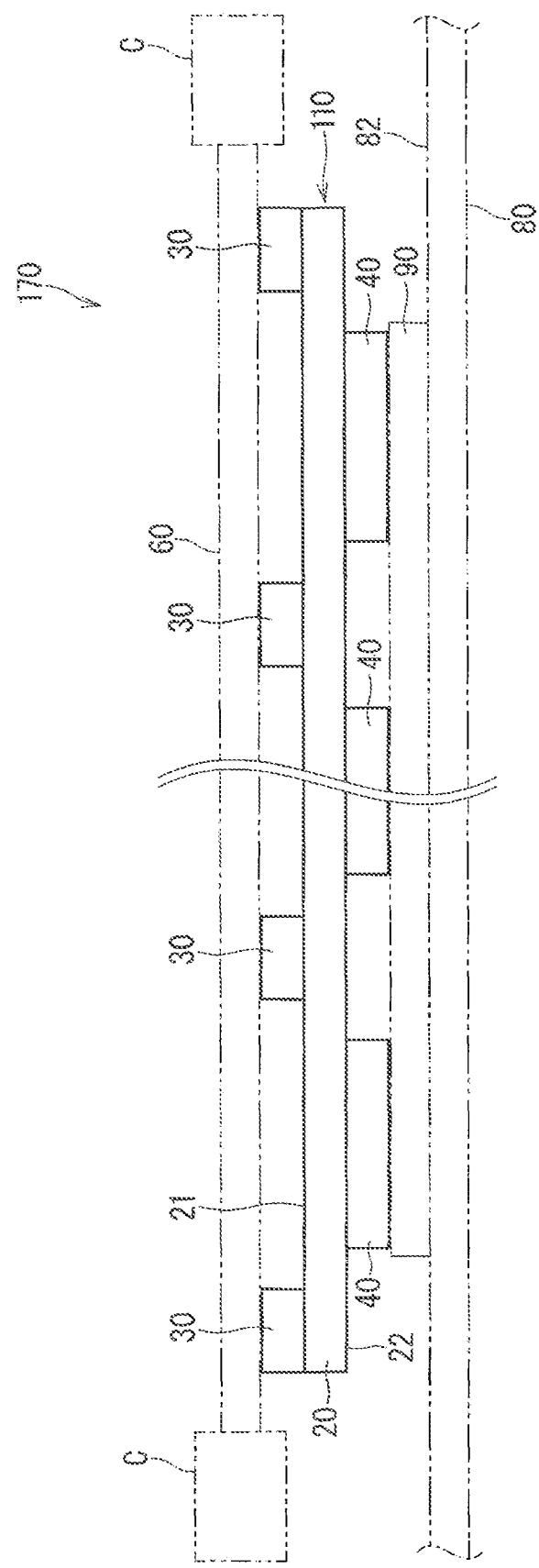
FIG. 7 is a side view illustrating a fixing structure of the wiring member including the fusion sheet.

A fusion sheet according to an 2 is described hereinafter. FIG. 6 is a side view illustrating a fusion sheet 110 according to the embodiment 2 and a wiring member 170 including the fusion sheet 110. FIG. 7 is a side view illustrating a fixing structure of the wiring member 170 including the fusion sheet 110. In the description of the present embodiment and modification example, the same reference numerals are assigned to the similar constituent elements described above, and the description thereof will be omitted.

The fusion sheet 110 is different from the fusion sheet 10 described above in that a dimension of the second section S2 is larger than that of the first section S1 along the extension direction of the base material layer 20. The dimension of the second section S2 is larger than that of the first section S1 along the extension direction of the base material layer 20 in the fusion sheet 110, thus a region for adhesion along the extension direction of the base material layer 20 can be increased.

The dimension of the first section S1 and the dimension of the second section S2 satisfying this configuration are not particularly limited, but can be appropriately set. For example, the dimension of the first section S1 along the extension direction of the base material layer 20 may have any value ranging from 10 millimeters to 30 millimeters. For example, the dimension of the second section S2 along the extension direction of the base material layer 20 may have any value ranging from 50 millimeters to 150 millimeters. For example, a difference between the dimension of the second section S2 along the extension direction of the base material layer 20 and the dimension of the first section S1 along the extension direction of the base material layer 20 may have any value ranging from 50 millimeters to 150 millimeters. For example, the dimension of the second section S2 along the extension direction of the base material layer 20 may have any value twice to ten times as large as the dimension of the first section S1 along the extension direction of the base material layer 20. For example, it is also applicable that the dimension of the first section S1 along the extension direction of the base material layer 20 is smaller than that of the base material layer 20 along the width direction of the base material layer 20, and the dimension of the second section S2 along the extension direction of the base material layer 20 is equal to or larger than that of the base material layer 20 along the width direction of the base material layer 20.

Furthermore, the fusion sheet 110 is different from the fusion sheet 10 described above in that the third section S3 is provided. The third section S3 is provided between the first section S1 and the second section S2. Accordingly, also in the fusion sheet 110, the laminated section of the fusion base part 30 and the laminated section of the adhesive base part 40 on the base material layer 20 are separately provided so as not to be overlapped with each oilier in the manner similar to the fusion sheet 10 described above. That is to say, the fourth section S4 is not provided to the fusion sheet 110. The third section S3 is provided, thus even when the dimension of the fusion base part 30 along the extension direction of the base material layer 20 is small, a jig for fusion has more hardly contact with the adhesive base part 40. As with the example illustrated in FIG. 6, the fusion base part 30 along the extension direction of the base material layer 20 wholly serves as the fusion part WP easily.

The dimension of the third section S3 along the extension direction of the base material layer 20 is not particularly limited, but can be appropriately set. For example, the dimension of the third section S3 along the extension direction of the base material layer may be smaller than that of the first section S1 and second section S2 along the extension direction of the base material layer 20.

Embodiment 3

Figure 8:
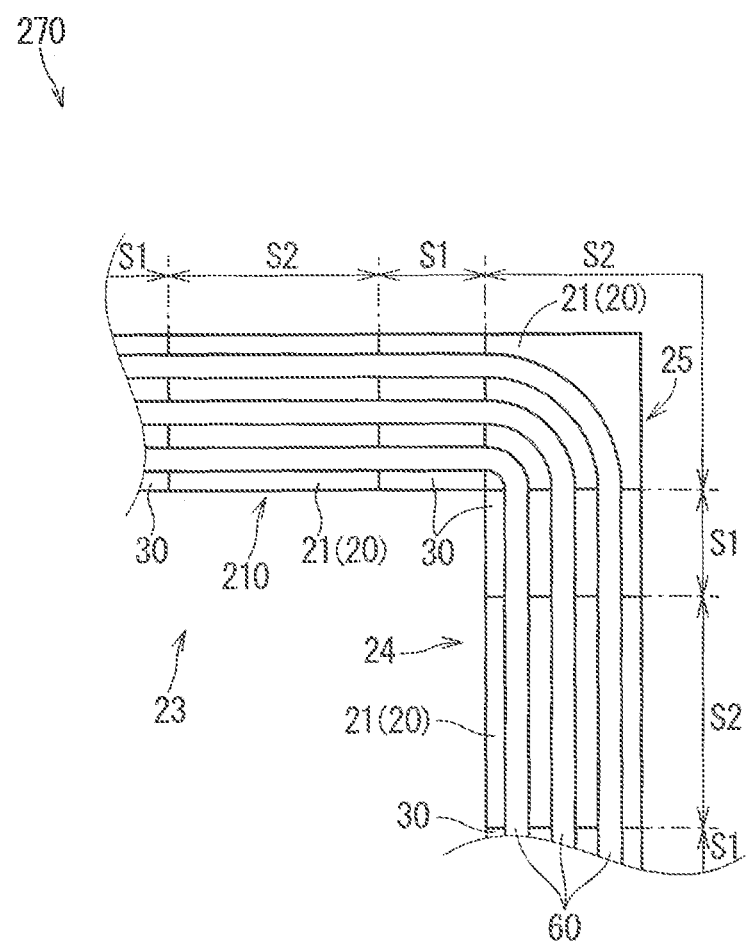
FIG. 8 is a plan view illustrating a fusion sheet according to an embodiment 3 and a wiring member including the fusion sheet.

A fusion sheet according to an embodiment 3 is described hereinafter. FIG. 8 is a plan view illustrating a fusion sheet 210 according to the embodiment 3 and a wiring member 270 including the fusion sheet 210.

The fusion sheet 210 is different from the fusion sheet 10 described above in that the base material layer 20 has a curved route. Specifically, the base material layer 20 includes two straight regions 23 and 24 each extending in a direction different from each other and a connection region 25 connecting two straight regions 23 and 24. In the example illustrated in FIG. 8, an extension direction of each of two straight regions 23 and 24 are perpendicular to each other, but may intersect with each other at an angle other than right angle. The first section S1 is provided in an end portion on a side of the connection region 25 in each of two straight regions 23 and 24. The second section S2 is provided in the connection region 25. The connection region 25 is a region where an extension region of each of two straight regions 23 and 24 is overlapped with each other. The connection region 25 typically has a parallelogram shape. As with the example illustrated in FIG. 8, when the extension direction of each of two straight regions 23 and 24 is perpendicular to each other, the connection region 25 has a quadrangular shape.

According to the fusion sheet 210 of the present example, when the wire-like transmission member 60 is curved and disposed from one of two straight regions 23 and 24 to the other one of two straight regions 23 and 24 via the connection region 25, the wire-like transmission member 60 is fused to the fusion base part 30 in the first section S1 provided on the end portion of each of two straight regions 23 and 24 on a side of the connection region 25, thus is easily held in a curved route.

Modification Example

Figure 9:
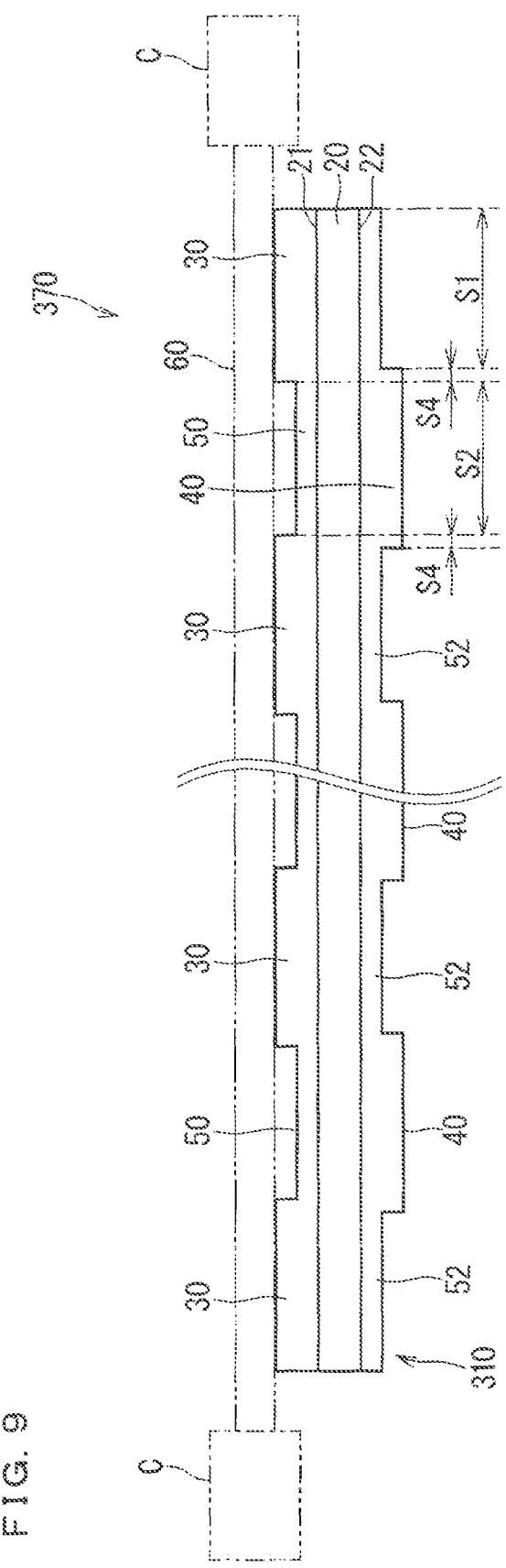
FIG. 9 is a side view illustrating a fusion sheet according to a modification example and a wiring member including the fusion sheet.

FIG. 9 is a side view illustrating a fusion sheet 310 according to a modification example and a wiring member 370 including the fusion sheet 310.

The fourth section S4 is provided to the fusion sheet 310. The fourth section S4 is provided between the first section S1 and the second section S2. The dimension of the fourth section S4 along the extension direction of the base material layer 20 is not particularly limited, but can be appropriately set. For example, the dimension of the fourth section S4 along the extension direction of the base material layer 20 may be smaller than that of the first section S1 and second section S2 along the extension direction of the base material layer 20. The fourth section S4 is provided in the fusion sheet 310, thus the fusion sheet 310 is hardly bended between the first section S1 and the second section S2. When the fourth section S4 is provided in the fusion sheet 310, the fourth section S4 may be fused to the wire-like transmission member 60, however, it is preferable that the fourth section S4 is not fused to the wire-like transmission member 60.

The fusion sheet 310 includes a first connection part 50 connecting the fusion base part 30, The first connection part 50 is made up of the same material as the fusion base part 30, and is formed to have a thickness smaller than the fusion base part 30. In this case, the first surface 21 of the base material layer 20 is whole hidden by the fusion base part 30 and the first connection part 50. The first connection part 50 appears in the first surface of the fusion sheet 310, and the base material layer 20 does not appear. A part where the first connection part 50 appears in the first surface of the fusion sheet 310 is concaved more than a part thereof where the fusion base part 30 appears. A part Where the first connection part 50 appear in the first surface of the fusion sheet 310 is the second section S2 or the third section S3.

The fusion sheet 310 includes a second connection part 52 connecting the adhesive base part 40. The second connection part 52 is made up of the same material as the adhesive base part 40, and is formed to have a thickness smaller than the adhesive base part 40. In this case, the second surface 22 of the base material layer 20 is whole hidden by the adhesive base part 40 and the second connection part 52. The second connection part 52 appears in the second surface of the fusion sheet 310, and the base material layer 20 does not appear. A part where the second connection part 52 appears in the second surface of the fusion sheet 310 is concaved more than a part thereof where the adhesive base part 40 appears. A part where the second connection part 52 appear in the second surface of the fusion sheet 310 is the first section S1 or the third section S3.

Figure 10:
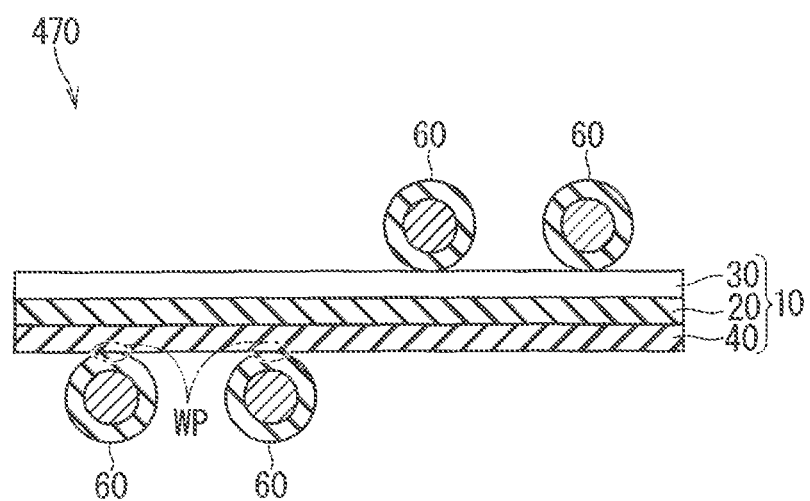
FIG. 10 is a cross-sectional view illustrating a modification example of the wiring member.

FIG. 10 is a side view illustrating a modification example of the wiring member 70.

In a wiring member 470 according to the modification example illustrated in FIG. 10, the wire-like transmission member 60 is fused to both surfaces of the fusion sheet 10. In the first surface of the fusion sheet 10, the wire-like transmission member 60 is fused to the fusion base part 30 in the manner similar to the wiring member 70. In the second surface of the fusion sheet 10, the wire-like transmission member 60 is fused to the adhesive base part 40. The adhesive base part 40 has the same material and structure as the fusion base part 30.

The wire-like transmission member 60 fused to the fusion base part 30 and the wire-like transmission member 60 fused to the adhesive base part 40 are separately formed along the width direction of the fusion sheet 10. The wire-like transmission member 60 fused to the fusion base part 30 is located on a side of one end along the width direction of the fusion sheet 10. The wire-like transmission member 60 fused to the adhesive base part 40 is located on a side of the other one end along the width direction of the fusion sheet 10.

Figure 11:
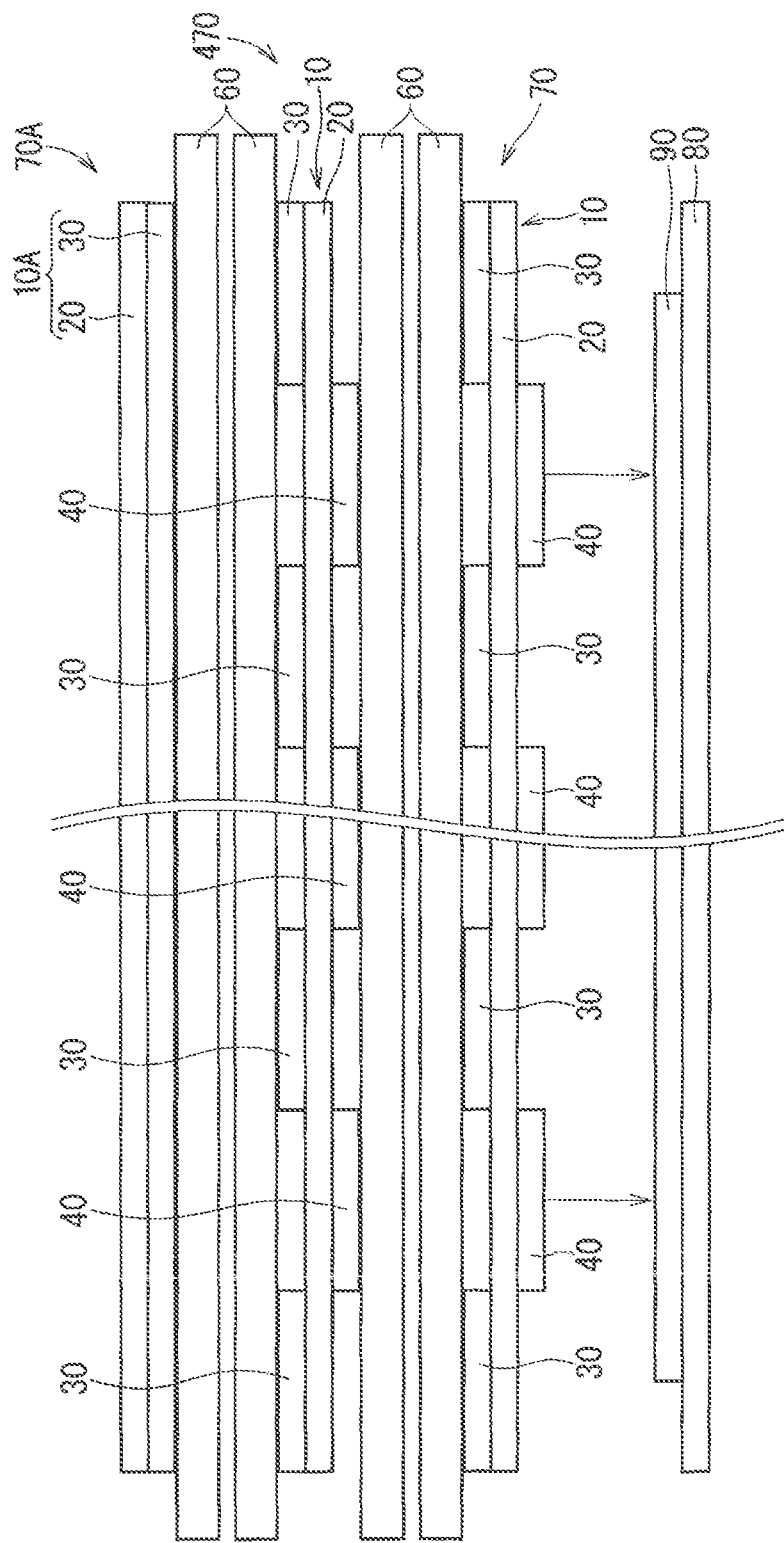
FIG. 11 is a side view illustrating a laminated body of the wiring member.

FIG. 11 is a side view illustrating laminated body of the wiring member and a fixing structure thereof.

In the example illustrated in FIG. 11, three wiring members 70, 70A, and 470 are stacked to constitute the laminated body of the wiring member. One wiring member 70 of three wiring members 70, 70A, and 470 is the same as the wiring member 70 described above. The other one wiring member 470 of three wiring members 70, 70A, and 470 is the same as the wiring member 470 described above. The remaining one wiring member 70A of three wiring members 70, 70A, and 470 is different from the wiring members 70, 170, 270, 370, and 470 described above. The adhesive base part 40 is not provided to a fusion sheet 10A in the wiring member 70A. The fusion base part 30 is continuously and wholly provided to the first surface of the base material layer 20 from the first end portion to the second end portion of the fusion sheet 10A along the extension direction of the base material layer 20. In the wiring member 70A, the wire-like transmission member 60 is fused to the first surface of the fusion sheet 10A. In the wiring member 70A, the wire-like transmission member 60 is not fused to the second surface of the fusion sheet 10A. The second surface 22 of the base material layer 20 is exposed in the wiring member 70A.

In three wiring members 70, the wiring member 70, the wiring member 470, and the wiring member 70A are overlapped with each other in this order. The adhesive base part 40 of the wiring member 70 is directed to the fixing target 80. The base material layer 20 of the wiring member 70A is directed to an outer surface.

The wire-like transmission member 60 of three wiring members 70, 70A, and 470 is located between the fusion sheet 10 of the wiring member 70 and the fusion sheet 10A of the wiring member 70A, and is protected by these fusion sheets 10 and 10A. As with the present example, the wiring member 470 in which the wire-like transmission member 60 is fused to each of the both surfaces of the fusion sheet 10 may be provided as an intermediate layer of the laminated body of three or more wiring members.

In the above description, the base material layer 20 has a single layer structure, however, this configuration is not necessary. The base material layer 20 may also have a multilayer structure. When the base material layer 20 has the multilayer structure, it is sufficient that at least the second surface 22 of the base material layer 20 is made up of a fibrous material sheet.

The configurations described in the embodiments and modification examples thereof can be appropriately combined as long as they are not contradictory.

EXPLANATION OF REFERENCE SIGNS 10, 10A, 110, 210, 310 fusion sheet
20 base material layer
21 first surface
22 second surface
23, 24 straight region
25 connection region
30 fusion base part
40 adhesive base part
50 first connection part
52 second connection part
60 wire-like transmission member
61 transmission wire body
62 covering layer
70, 70A, 170, 270, 370 wiring member
80 fixing target
82 arrangement surface
90 adhesive member
S1 first section
S2 second section
S3 third section
S4 fourth section
C connector WP fusion part
UW ultrasonic fusion machine
H horn
A anvil

The invention claimed is:

1. A fusion sheet, comprising:
a base material layer including a first surface and a second surface, and
the base material layer includes two straight regions each extending in a direction different from each other and a connection region connecting the two straight regions;
a fusion base part partially stacked to the first surface of the base material layer and fusible to a wire-shape transmission member;
an adhesive base part partially stacked to the second surface of the base material layer and having larger adhesive strength with an adhesive member than the base material layer, wherein
a plurality of first sections and a plurality of second sections are provided along an extension direction of the base material layer,
each of the first sections is a section where the fusion base part is stacked to the base material layer other than a laminated section where the adhesive base part is stacked, and
each of the second sections is a section where the adhesive base part is stacked to the base material layer other than a laminated section where the fusion base part is stacked; and
wherein one of the plurality of first sections is provided in an end portion of one of the two straight regions on one side of the connection region and another of the plurality of first sections is provided in an end portion of the other of the two straight regions on another side of the connection region, and
one of the plurality of second sections is provided to the connection region.

2. The fusion sheet according to claim 1, wherein
the second surface of the base material layer is exposed in the plurality of first sections, and
the first surface of the base material layer is exposed in the plurality of second sections.

3. The fusion sheet according to claim 1, wherein
the laminated section of the fusion base part and the laminated section of the adhesive base part on the base material layer are separately provided so as not to be overlapped with each other.

4. The fusion sheet according to claim 1, wherein
a dimension of each of the second sections is larger than a dimension of each of the first sections along the extension direction of the base material layer.

5. The fusion sheet according to claim 1, wherein
a resin material as a main material of the fusion base part is a same as a resin material as a main material of the adhesive base part.

6. The fusion sheet according to claim 1, wherein
the base material layer is formed of a fibrous material sheet,
the adhesive base part is formed of a sheet having an inner portion evenly filled, and
a surface of the adhesive base part is smoother than a surface of the base material layer.

7. A wiring member, comprising:
a fusion sheet, including:
a base material layer including a first surface and a second surface;
a fusion base part partially stacked to the first surface of the base material layer and fusible to a wire-shape transmission member; and
an adhesive base part partially stacked to the second surface of the base material layer and having larger adhesive strength with an adhesive member than the base material layer, wherein
a plurality of first sections and a plurality of second sections are provided along an extension direction of the base material layer,
each of the first sections is a section where the fusion base part is stacked to the base material layer other than a laminated section where the adhesive base part is stacked, and
each of the second sections is a section where the adhesive base part is stacked to the base material layer other than a laminated section where the fusion base part is stacked; and
wherein the wire-shape transmission member is fused to the fusion base part in each of the first sections.

8. The wiring member according to claim 7, wherein
the wire-shape transmission member is disposed to extend along the extension direction of the base material layer.

9. The wiring member according to claim 8, wherein
in the fusion sheet, each of the first sections is provided on opposite sides of each of the second sections, and
the wire-shape transmission member is fused to each of the first sections on opposite sides of each of the second sections while passing through each of the second sections.

10. A wiring member, comprising:
the fusion sheet according to claim 1; and
a wire-shape transmission member fused to the fusion base part in each of the first sections, wherein
the wire-shape transmission member is curved and disposed in the connection region, and
wherein the wire-shape transmission member is fused to the one of the plurality of first sections provided in the end portion of the one of the two straight regions and the another of the plurality of first sections provided in the end portion of the other of the two straight regions.

* * * * *